E. RITSON.
SEEDING MACHINE.
No. 69,484.                    Patented Oct. 1, 1867.
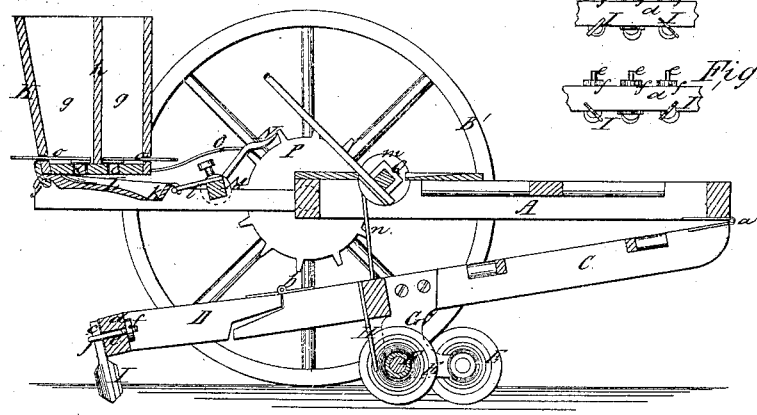
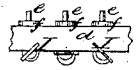
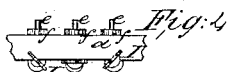
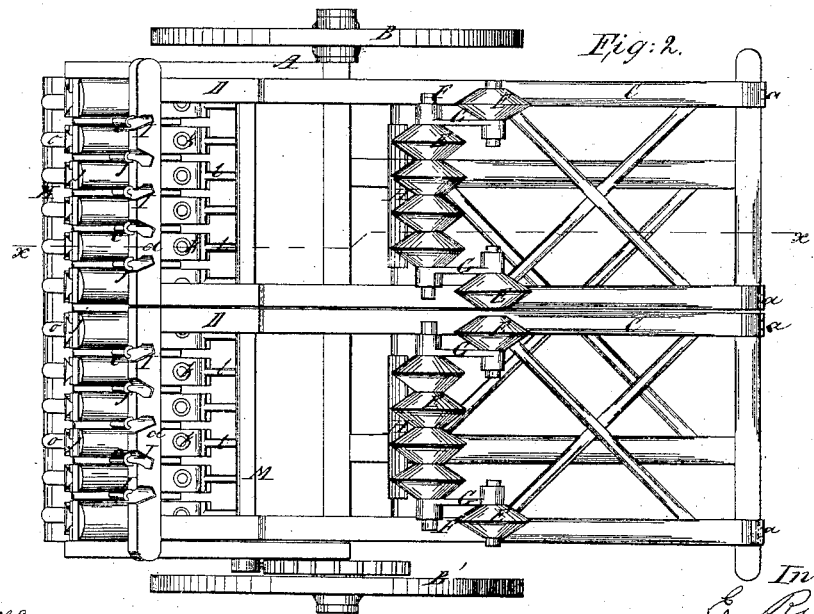

UNITED STATES PATENT OFFICE.

EDWIN RITSON, OF MALTAVILLE, NEW YORK, ASSIGNOR TO WM. H. BURTIS OF SAME PLACE.

IMPROVEMENT IN SEEDING-MACHINES.

Specification forming part of Letters Patent No. 69,484, dated October 1, 1867.

*To all whom it may concern:*

Be it known that I, EDWIN RITSON, of Maltaville, Saratoga county, New York, have invented a new and Improved Seeding-Machine; and I do hereby declare that the following is a full, clear, and exact description thereof, which will enable others skilled in the art to make and use the same, reference being had to the accompanying drawings, forming part of this specification.

This invention relates to a new and improved seeding-machine of that class designed for sowing seed in drills, and is an improvement on a machine for which Letters Patent were granted to me bearing date July 10, 1860.

In the accompanying sheet of drawings, Figure 1 is a side sectional view of my invention, taken in the line $x\ x$, Fig. 2; Fig. 2, an inverted plan of the same; Figs. 3 and 4, detached inverted plans of a number of the covering-teeth, showing the way in which they are adjusted.

Similar letters of reference indicate corresponding parts.

A represents a frame, which is mounted on two wheels, B B', and to which the draft-power is applied.

To the front end of the frame A there are connected by pivots or hinges $a$ two frames, C C, and to the rear of each frame C there is connected by joints or hinges $b$ a supplemental frame, D, as will be fully understood by referring to Fig. 1.

To the rear of each frame C there are attached a series of rotary furrow-openers, E, placed on shafts F, the bearings of which are in plates G attached to the sides of the frames C and depend therefrom.

Four furrow-openers, E, are shown on the shaft of each frame C; but besides these there are shown two in advance, one at each side of each frame, and having their bearings in the front ends of the plates G, the latter being of bent or angular form, as shown in Fig. 1. These furrow-openers have V-shaped edges to penetrate the earth, as shown clearly in Fig. 2, and they are kept clean, or earth prevented from adhering to them, by scrapers H, attached to the rear cross-bar of the frames C. In practice it is designed to have the edges of the furrow-openers two inches apart, so that the seed may be planted in drills as close as that, when desired.

To the rear bar of each supplemental frame D there are attached a series of coverers, I, the shape of which is shown clearly in Fig. 1. These coverers are provided with round or cylindrical tangs $c$, which are secured to the rear bars, $d$, of the frame D by means of eyes J, which are formed at the ends of rods $e$, the latter passing through the bars $d$, and having screw-nuts $f$ on their inner ends, by screwing up which the tangs of the coverers will be firmly clamped in position. These coverers are in line with the centers of the spaces between the edges of the furrow-openers, and by securing the coverers I to the bars $d$ they may be adjusted so as to throw earth upon and cover the seed, or throw the earth from the seed and form ridges of earth between the drills. Some kinds of seed—such as oats, for instance—are covered, and the coverers are adjusted to effect that end (see Fig. 4) where oats are being planted, but in planting or sowing wheat the coverers are adjusted to throw the earth up between the drills (see Fig. 3) in order to protect the wheat from the frost. Both the furrow-openers and the coverers are allowed to rise and fall freely to conform to the inequalities of surface over which they may pass.

On the rear part of the frame A there is placed a seed-box, K, which is divided into two compartments, $g\ g'$, by a vertical partition, $h$, each compartment having a series of holes, $i$, made in its bottom, the holes in the two compartments being in line with each other in a direction longitudinal with frame A.

To the under side of the seed-box K there are attached a series of shoes, L, the latter being connected by joints $j'$ to the rear end of the seed-box. These shoes have discharge-openings $k$ in them near their front ends, and they are in line with the edges of the furrow-openers E. The front ends of the shoes L rest on arms $l$, which are attached to a shaft, M, said shaft being placed transversely on the frame A, and having an arm, N, on one end of it, which, by means of a spring, O, is made to bear against a bottom wheel, P, attached concentrically to the wheel B'. By this means as the machine is drawn along a vibrating motion is given the shoes L by the action of the wheel P against the arm N.

The furrow openers and coverers may be raised above the surface of the earth, when necessary, by turning a shaft, Q, on frame A, said shaft having the eccentrics $m$ $m$ upon it, to which the frames C C are attached by cords or chains $n$ $n$.

The holes $i$ in the compartments $g$ $g'$ of the seed-box are each provided with a slide, $o$, to admit of all or any of the holes being cut off or closed when desired.

From the above description it will be seen that the different kinds of seed-grain and grass-seed, for instance, may be planted in the same drill when desired, the compartment $g$ being supplied with one kind of seed and the compartment $g'$ with another kind, or by closing certain holes $i$ in the two compartments grass-seed may be sown between drills of wheat and rye, or a pulverulent manure may be sown with grain or any seed.

What I claim as new, and desire to secure by Letters Patent, is—

1. The combination of the rotary furrow-openers E and coverers I, attached respectively to the frames C D, the former being connected by hinges or joints $a$ to the front end of the frame A, and the latter connected by hinges or joints $b$ to the rear of the frames C, substantially as and for the purpose set forth.

2. The vibrating shoes L, arranged and operated as shown, in connection with the seed-box K, provided with one or more compartments, and all arranged substantially as and for the purpose specified.

3. The attaching of the coverers I to the rear bars, $d$, of the supplemental frames D, to admit of the adjustment of the coverers, substantially in the manner as and for the purpose set forth.

4. The combination of the furrow-openers E, coverers I, and the seed-distributing device composed of the vibrating shoes L and perforated bottom of the seed-box, provided with slides $o$, all arranged substantially as and for the purpose specified.

EDWIN RITSON.

Witnesses:
HENRY VAN HYNING,
LUTHER D. HOSFORD.